(12) United States Patent
Hadley

(10) Patent No.: US 6,697,900 B1
(45) Date of Patent: Feb. 24, 2004

(54) BUS MONITOR AND METHOD OF GATHERING BUS PHASE INFORMATION IN REAL-TIME

(75) Inventor: Andrew Hadley, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 555 days.

(21) Appl. No.: 09/740,907

(22) Filed: Dec. 19, 2000

(51) Int. Cl.[7] .............................. G06F 13/00; G06F 3/00
(52) U.S. Cl. ........................ 710/109; 710/46; 710/15; 710/16; 710/17; 710/18; 710/19
(58) Field of Search ............................ 710/15–19, 46, 710/109

(56) References Cited

U.S. PATENT DOCUMENTS

| | | | |
|---|---|---|---|
| 5,361,346 A | * | 11/1994 | Panesar et al. ............... 714/42 |
| 5,524,268 A | * | 6/1996 | Geldman et al. ............... 710/5 |
| 5,606,673 A | * | 2/1997 | Chounan .................... 710/309 |
| 6,243,834 B1 | * | 6/2001 | Garrett ....................... 714/37 |

FOREIGN PATENT DOCUMENTS

JP          08249246 A    *   9/1996   ............ G06F/13/00

OTHER PUBLICATIONS

"Phase–time measuring device for SCSI system bus", Derwent–Acc–No. 1996–046996, Pub–No. JP 07311733A, Pub–Date Nov. 28, 1995.*

* cited by examiner

Primary Examiner—Sumati Lefkowitz
Assistant Examiner—Trisha Vu
(74) Attorney, Agent, or Firm—Suiter West PC LLO

(57) ABSTRACT

Control signals of an I/O or peripheral bus are sensed during cycles of the bus and information describing bus phases of the signals is derived by sensing the control signals and is stored in a register. During a sampling time period, a processor reads the bus phase information from the register and computes bus activity information by using the bus phase information. The computed bus information is continuously updated and displayed to reflect actual communication activity on the bus occurring substantially in real-time.

17 Claims, 3 Drawing Sheets

BUS MONITOR AND METHOD OF GATHERING BUS PHASE INFORMATION IN REAL-TIME

FIELD OF THE INVENTION

This invention relates to computer systems, and more particularly to a new and improved bus monitor and method of monitoring the operation of an input/output (I/O) or peripheral bus and displaying information in real-time which describes the phases or operations performed by the bus, to enable a better understanding of the performance and activity on the bus.

BACKGROUND OF THE INVENTION

A communication bus in a computer system is a set of conductive wires that forms a transmission path for communicating data between components of the computer system. The conductive wires include address lines, data lines and control lines. Signals are asserted on the address, data and control lines during bus cycle intervals to communicate address, data and control and status signals between components of the computer system according to a bus protocol. The bus protocol describes the signals which control communication between components of the computer system. The bus protocol is implemented by the application of control signals during each bus cycle in which data, address and control and status information is communicated between the components connected to the bus. Communicating data typically requires many bus cycles to transfer the data between components, although the communication of address and control and status information may require only one bus cycle.

A SCSI bus is a well-known example of an I/O or peripheral bus used in a computer system. A SCSI bus includes many address and data lines and a lesser number of control lines. The control lines communicate different control and status messages or signals. The combination of control signals that are asserted on the control lines during each SCSI bus cycle form a SCSI bus phase. For example, the SCSI bus control signals include a request signal (REQ), an acknowledge signal (ACK), a busy signal (BSY), a selection signal (SEL), an attention signal (ATN), a message signal (MSG), a command signal (C_D), and an I/O signal (I_O). The SCSI bus phases include BUS FREE, ARBITRATION, SELECTION, RESELECTION, COMMAND, DATA, STATUS and MESSAGE. A COMMAND bus phase occurs when the MSG signal is in a low logic state, the C_D signal is in a high logic state, and the I_O signal is in a low logic state during a bus cycle. In the COMMAND phase, a command is sent from one component to another component connected to the bus. Data is transferred on data lines of the SCSI bus during the COMMAND, DATA, STATUS and MESSAGES phases, which are collectively termed the information transfer phases. The SCSI bus is never in more than one bus phase at a time during each bus cycle.

A bus monitor is used for monitoring signals asserted on an I/O or peripheral bus, such as a SCSI bus, used in a computer system. The bus monitor senses signals asserted during bus phases of activity occurring on the bus. The communication activity is then displayed so that it can be observed and analyzed by a user to determine whether the bus is operating properly and efficiently, and to identify problems which may be occurring on the bus or with the components which are connected to the bus.

One typical bus monitor is a trace analyzer program. The trace analyzer program generates a considerable amount of bus activity for a few seconds, and captures a history of the signals asserted on the bus during the few seconds of communication activity. The trace history is then analyzed to identify distinct bus phases comprising the captured signal activity, and to identify communications occurring during the bus phases identified. Since the trace analyzer program generates the bus activity, the generated activity is in many regards artificial because it does not represent the types of activity which may actually occur during realistic use of the computer system.

The trace analyzer can capture only a few seconds of bus communication activity at a time based on stimulation of a somewhat artificial nature, and it cannot display bus information continuously in real-time as would occur during realistic use of the bus in a fully-functional computer system. Any information captured by the trace analyzer must be processed, analyzed and displayed after the capture of information is complete. The trace analyzer must then be restarted to stimulate more activity and capture additional information caused by that stimulated activity. The resulting discontinuity with respect to the previous information captured does not reflect the intervening activity on the bus, thereby preventing real-time information from being obtained. The trace analyzer cannot display the current bus phase that is active on the bus, and cannot periodically and continuously display the percentages of activity associated with each distinct bus phase during the short monitoring period or over a longer time period. In general, the load, efficiency and performance of the bus cannot be observed in real-time using the trace analyzer because the trace analyzer does not produce immediate and continuous information.

These and other considerations that have given rise to the present invention.

SUMMARY OF THE INVENTION

One aspect of the present invention relates to monitoring activity of an I/O or peripheral bus and generating and displaying information describing bus information occurring in real-time during typical communication activity. Another aspect of the invention relates to displaying percentages of occurrences for bus phases that have been active during a predetermined sampling period. Another aspect of the invention relates to allowing a user to observe the load, efficiency and performance of the bus continuously in real-time by observing bus information derived from real-time, normal communication activity.

In accordance with these and other aspects, the present invention is directed to a bus monitor for monitoring bus phases of an I/O bus and generating bus information describing activity of the bus in real-time. The I/O bus has control lines upon which control signals which define bus phases are asserted during each cycle of bus activity. The bus monitor comprises a storage device connected to the control lines to sense the control signals asserted on the control lines and to store bus phase information describing the bus phases defined by the control signals. The bus monitor also includes a processor connected to the storage device and operative to retrieve the bus phase information from the storage device at a predetermined polling rate and to compute the bus information from the retrieved bus phase information. Preferably, a display presents the computed bus information.

In accordance with other aspects, the present invention also relates to a method of generating bus information in real-time which describes activity of an I/O bus during bus phases occurring in bus cycles. The method involves the steps of sensing signals asserted on the bus which define the bus phases, deriving bus phase information from the sensed signals, collecting the bus phase information during a sampling period which extends over a plurality of bus cycles, computing bus information using the bus phase information collected during the sampling period, and continuously repeating the sampling time periods. Other preferred aspects of the method include displaying the computed bus information after each sampling period, and storing the bus phase information in memory during each sampling period prior to computing the bus information.

These and other aspects of the present invention permit actual activity of the bus to be observed in real-time, thereby allowing the user to monitor the performance of the bus continuously and observe any problems which might negatively impact the performance of the bus.

A more complete appreciation of the present invention and its improvements can be obtained by reference to the accompanying drawings, which are briefly summarized below, by reference to the following detailed description of a presently preferred embodiment of the invention, and by reference to the appended claims.

BRIEF DESCRIPTION OF THE DRAWINGS AND

DETAILED DESCRIPTION

Figure 1:
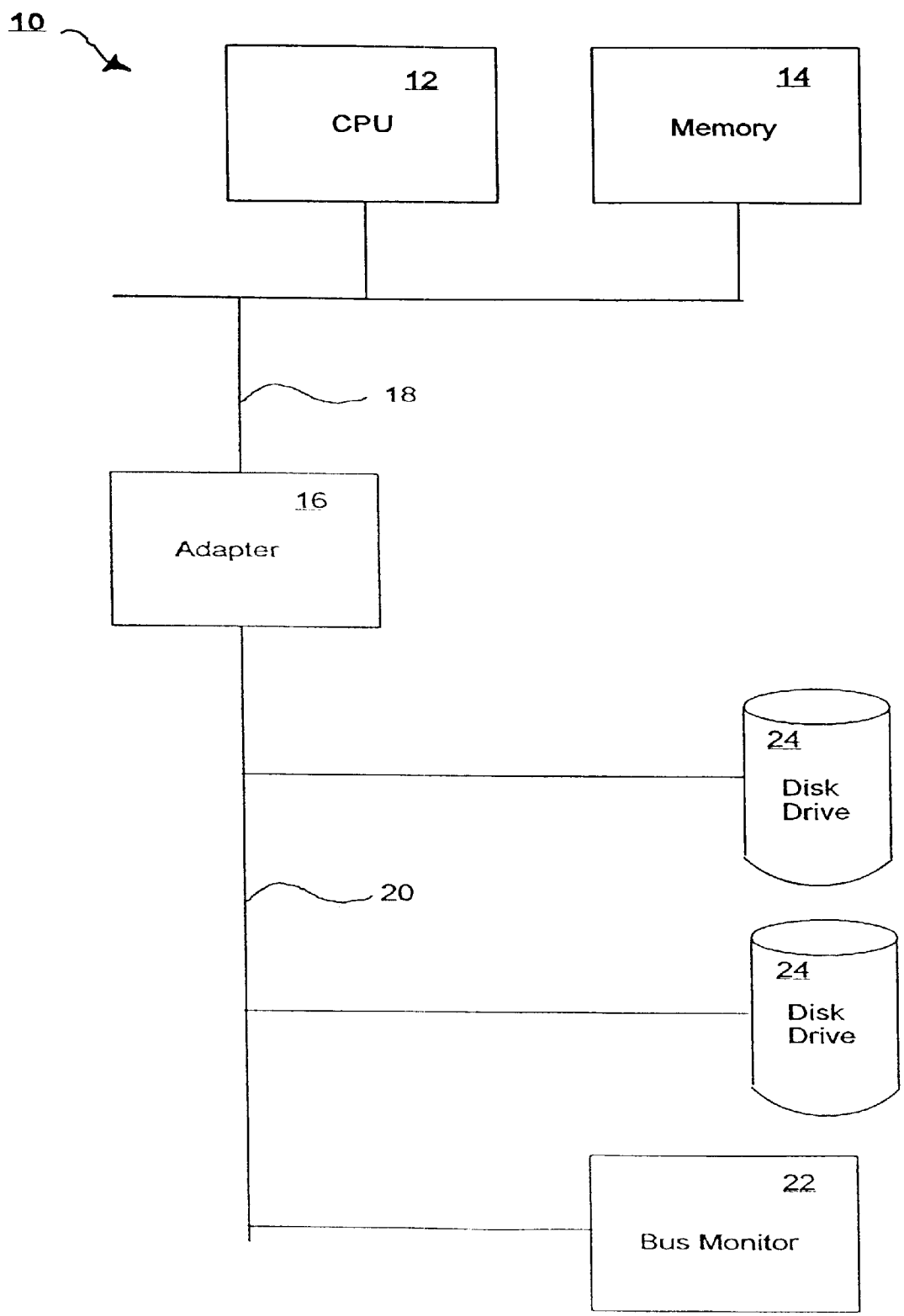
FIG. 1 is a block diagram of a portion of a typical computer system which includes an I/O or peripheral bus which incorporates a bus monitor of the present invention and which illustrates methodology of the present invention.

The present invention is incorporated into a computer system 10 of the type generally shown in FIG. 1. The computer system 10 includes a conventional central processing unit (CPU) 12, a conventional memory 14 and a conventional peripheral bus adapter 16 connected together via a conventional system bus 18. The computer system 10 may also include other conventional components (not shown) typically connected to the system bus 18. The adapter 16 connects a conventional peripheral or input/output (I/O) bus 20 as a part of the computer system 10. The adapter 16 permits communication between the CPU 12 and memory 14 and typical peripheral devices 24, such as disk drives, by communicating the information between the peripheral bus 20 bus and the system bus 18, in a conventional manner. The CPU 12 communicates with the adapter 16 on the system bus 18, and the adapter 16 communicates with the I/O devices 24 and a bus monitor 22 on the I/O bus 20. One example of a typical or preferable I/O bus 20 is a small computer standard interface (SCSI) bus, although a variety of other types of peripheral buses are usable with the present invention.

The present invention involves a bus monitor 22 which is connected to the I/O bus 20. The bus monitor 22 senses certain control and status signals present on the I/O bus 20, and using those sensed signals, identifies bus phases occurring during bus cycles and generates and displays information describing the bus phases occurring on the I/O bus 20 and other bus information derived from the bus phase information. Displaying the derived bus information permits evaluation and observation of the load, efficiency and performance of the I/O bus 20, among other things, continuously in real-time without interrupting or degrading the normal communication activity occurring on the bus 20.

Figure 2:
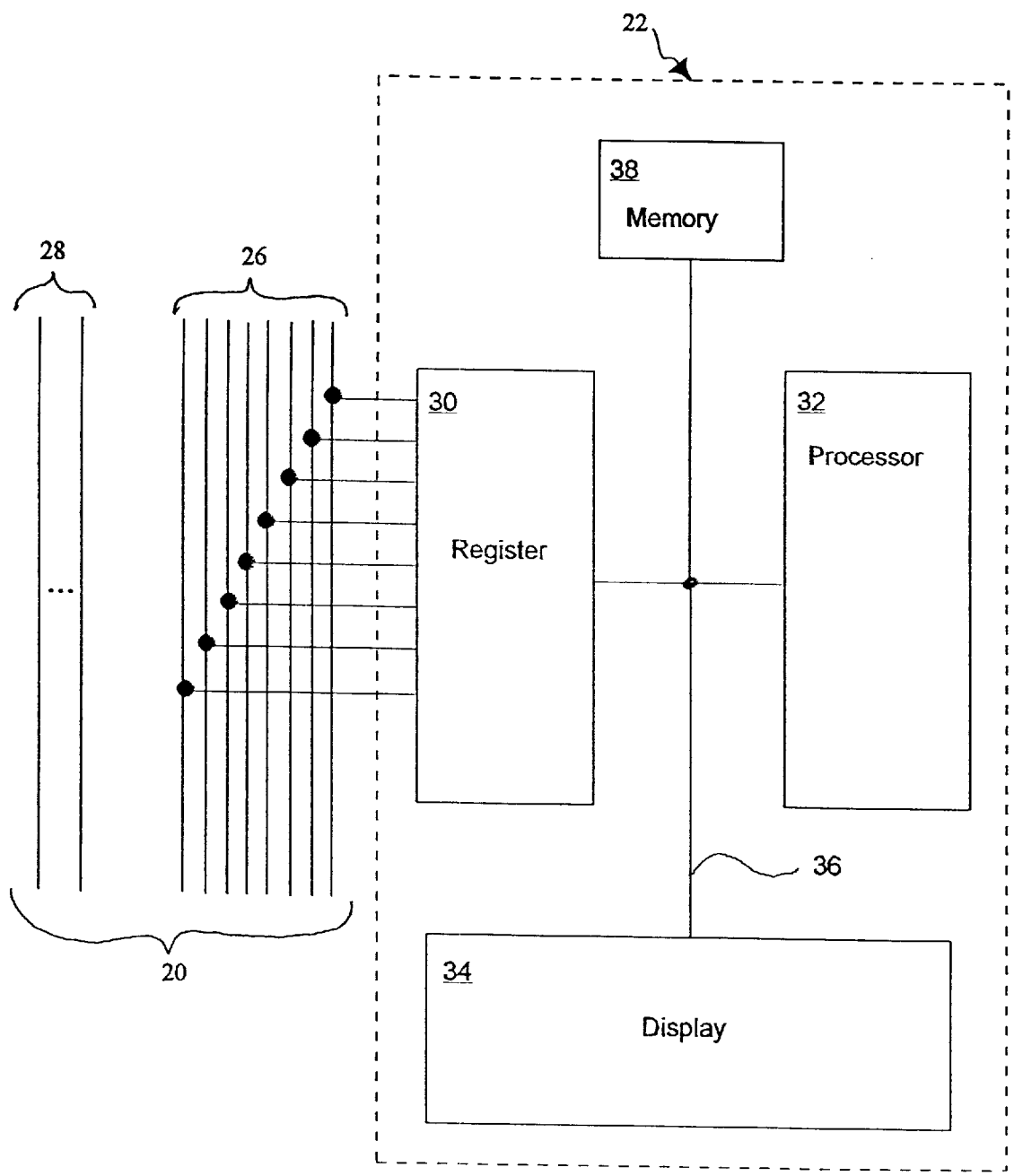
FIG. 2 is a block diagram of the bus monitor of the I/O or peripheral bus shown in FIG. 1.

More details of the I/O bus 20 and the bus monitor 22 are shown in FIG. 2. The I/O bus 20 includes control lines 26 upon which there are conducted control and status signals to control the transfer of data and addresses on data and address lines 28. In the case of where the I/O bus 20 is a SCSI bus, there are eight control lines 26, each of which separately asserts a request signal (REQ), an acknowledge signal (ACK), a busy signal (BSY), a selection signal (SEL), an attention signal (ATN), a message signal (MSG), a command signal (C_D), and an I/O (I_O) signal. Preferably, the I/O bus 20 will include many more address and data lines 28. During each bus cycle or time interval during which a single communication occurs on the I/O bus 20, at least one of the control and status signals is asserted on the control lines 26. The bus cycles are controlled and established by the adapter 16 and the peripheral devices 24 (FIG. 1). The one or ones of the control and status signals asserted on the control lines 26 during each bus cycle define(s) a distinct bus phase. For example in a SCSI bus, the assertion of a logic low value on the MSG and I_O lines, and the assertion of a logic high value on the C_D line defines COMMAND bus phase in which command data is transferred over the lines 28 during a bus cycle. In a SCSI bus, the bus phases are designated BUS FREE, ARBITRATION, SELECTION, RESELECTION, COMMAND, DATA, STATUS and MESSAGE. More or less bus phases may exist on other types of peripheral buses.

The bus monitor 22 includes a register 30 or other storage device, a processor 32 and a display 34 connected via an internal bus 35. The register 30 is connected to the control lines 26 of the I/O bus 20. The register 30 continuously senses the control lines 26 of the I/O bus 20 and stores the signals present on the control lines 26 which define the current bus phase of the I/O bus 20. Preferably, the register 30 senses and stores only the signals currently asserted on the control lines 26 which define the bus phase occurring during the present bus cycle, although the register 30 could have sufficient storage capacity to store the signals which define a predetermined multiple number of previously-existing bus phases in addition to the signals defining the current bus phase.

The processor 32 periodically reads or polls the register 30 to obtain the information defining the bus phase or phases. The processor 32 may transfer the bus phase information to the memory 36 after polling the register 30. Using the information obtained from the register 30, or the information obtained from the memory 36 after transfer from the register 30, the processor 32 computes or generates the bus information which describes the operation and performance of the bus 20 during a sampling time period in which the bus phase information was derived. After computing the bus information from the information, the processor 32 supplies the computed bus information to the display 34, where that information is displayed for the user or observer.

The bus information is generated by the processor 32 and displayed at the display 34 occurs as a result of the processor 32 executing program instructions contained in a memory. Preferably, the processor 32 is a typical microcontroller in which its program instructions are permanently stored in a memory associated with the microcontroller. However, the processor 32 may be a conventional microprocessor with an external memory 36 connected to the internal bus 34 which stores the programming instructions used to generate the bus information.

Figure 3:
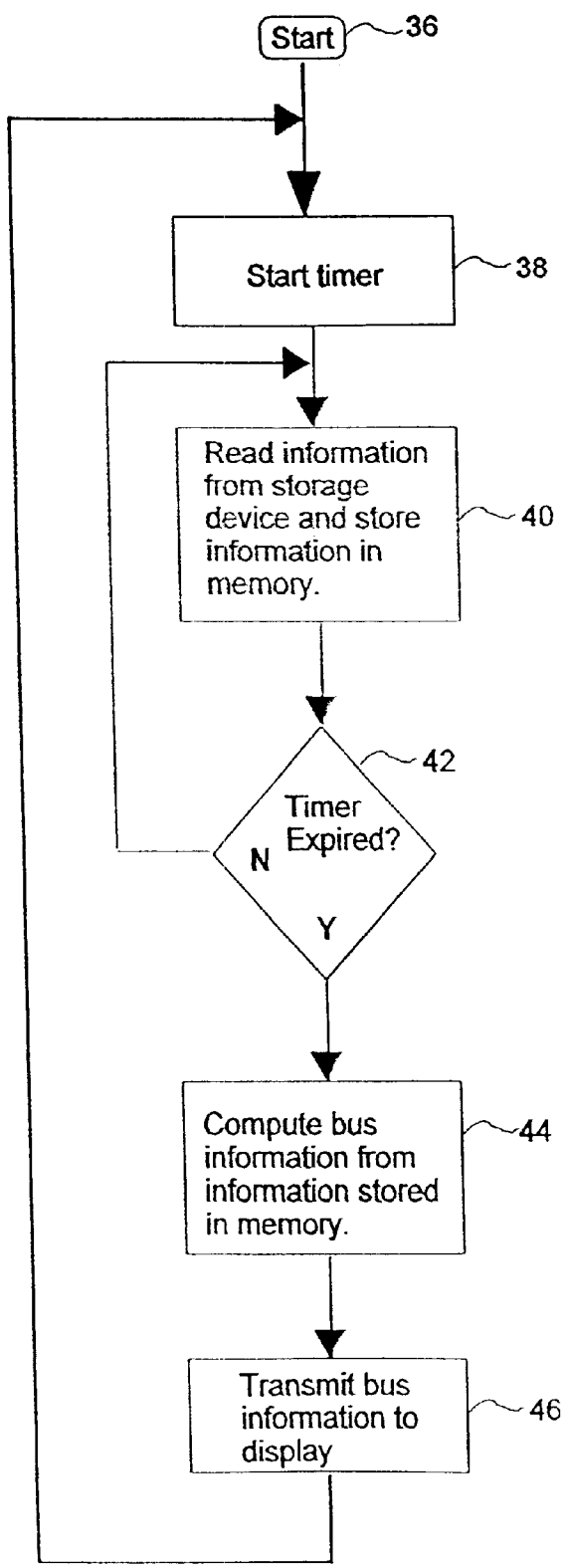
FIG. 3 is flow chart of program instructions executed by a processor of the bus monitor shown in FIG. 2 and which also illustrates aspects of the methodology of the present invention.

The functions performed as a result of the processor 32 executing the program instructions by which to generate the bus information are shown in FIG. 3 and described in relation to the bus monitor 22 shown in FIG. 2. The program execution begins at step 37 with the step 38 of starting a timer and beginning a sampling time period. The timer is set to expire at the end of the sampling time period of three to four seconds, for example. It is during the sampling time period that the bus phase information is read from the register 30 and stored in memory 36 as shown at step 40. The timer is checked at step 42 to determine if the timer has expired, indicating the end of the sampling period. Until the timer has expired, the program flow loops back from the determination at step 42 to the step 40, permitting additional bus phase information to be read from the register 30 and stored in memory at step 40. The repetition rate at which the loopback occurs to read additional information from the register 30 constitutes a polling rate.

The bus phase information from the register 30 is read once during each periodic polling interval established by the polling rate. The polling intervals occur continuously over the much longer sampling period. For example, the processor 32 may cause the register 30 to be read at a polling rate of approximately 3000 times per second, thereby obtaining the bus phase information at a polling interval every 33 microseconds. This 3000 Hz polling rate will typically be less than the frequency of the bus cycles, thereby somewhat randomly recognizing only the bus phases that exist at each polling interval and not the bus phases which exist at times between the polling events that occur once each polling interval. Alternatively, the polling rate may be approximately equal to the frequency of the bus cycles. As a further alternative, the information retrieved from the register 30 may describe all of the bus phases which existed since the previous polling event. In the case where the register 30 stores information describing more than one bus phase, the information describing all of the intervening bus phases which have been stored since the previous polling event will be read at the next polling event occurring during the next polling interval, and the register 30 will be reset or cleared after having been read. Thus, in the example of a sampling period extending for four seconds and a polling rate occurring at 3000 Hz, were only one item of bus phase information is obtained at each polling interval, approximately 12,000 polling events will occur and 12,000 items of bus phase information will be obtained during each sampling period.

The bus phase information obtained during the sampling time period is stored in memory at step 40. As noted above, if the processor is a microcontroller, the information stored at step 40 may be stored in an internal memory of the microcontroller. If the processor is a microprocessor, the information stored at step 40 may be stored in the external memory 36.

Once the timer has expired as determined at step 42, the bus information is calculated or computed at step 44, using the bus phase information which was stored in memory at step 40 during the sampling period. The bus information may be based on any type of mathematical calculation derived from the bus phase information. For example, the computation performed at step 44 may derive the percentage of occurrence of each particular bus phase relative to the total number of bus phases which occurred during the sampling time period, or the computation performed at step 44 may total the number of each of the particular bus phases which existed during the sampling time period. A variety of other types of bus information may be derived at the computational step 44, based on the individual bus phases which existed during the sampling time period. The computations performed at step 44 may also take into account the information gained from previous sampling periods, if desired.

The bus information is displayed at step 46 by sending the bus information to the display 34 over the internal bus 36 and displaying the bus information on the display 34. Preferably, the display 34 updates the bus information after each sampling period. The program then loops back to step 38 and begins a new sampling period.

Because of the relatively high computational speed of the processor 32, very little time is consumed in the computational step 44 and in the transmission step 46, thereby assuring that the substantial majority of the bus phases will be sampled as information during the sampling time period occurring as a result of the steps 38, 40 and 42. As a result, substantially continuous, real-time information is collected and displayed. The bus information is computed and displayed based on actual bus communication activity occurring on the I/O bus. Immediate information is provided which allows the user to observe the load, efficiency and performance of the bus in real-time with respect to actual communication activities. Many other advantages and improvements will be apparent after gaining an understanding of the present invention.

In the preferred embodiment shown in FIG. 1, the bus monitor 22 preferably takes the form of a portion of a conventional peripheral bus adapter such as that shown at 16, with the exception that its processor has been programmed to perform the functions described above for the bus monitor 22, and the register 30 is used to sense and store the control signals on the control lines 26 (FIG. 2). In a similar sense, the present invention may also be implemented by the bus adapter 16 itself, or in conjunction with the CPU 12 (FIG. 1) by using the information which the bus adapter 16 transmits on the control lines 16 or receives from the peripheral devices 24 on its control lines. In such circumstances, the bus information would be presented to the display 34 that is connected on either the I/O bus 20 or the system bus 18.

The presently preferred embodiments of the present invention have been shown and described with a degree of particularity. These descriptions are of preferred examples of the invention. In distinction to its preferred examples, it should be understood that the scope of the present invention is defined by the scope of the following claims, which should not necessarily be limited to the detailed description of the preferred embodiments set forth above.

The invention claimed is:

1. A bus monitor for monitoring bus phases of an I/O bus and generating bus information describing activity of the bus in real-time, the I/O bus having control lines upon which control signals which define bus phases are asserted during each cycle of bus activity, the bus monitor comprising:
    a storage device connected to the control lines to sense the control signals asserted on the control lines and to store bus phase information describing the bus phases defined by the control signals sensed; and
    a processor connected to the storage device and operative to retrieve the bus phase information from the storage device at a predetermined polling rate and to compute the bus information from the retrieved bus phase information.

2. A bus monitor as defined in claim 1 further comprising:

a memory connected to the processor into which the retrieved bus phase information is stored, and from which the bus phase information is obtained when the processor computes the bus information.

3. A bus monitor as defined in claim 1 wherein:

the predetermined polling rate is different from the rate at which bus cycles occur.

4. A bus monitor as defined in claim 1 wherein:

the predetermined polling rate occurs during a predetermined sampling time period.

5. A bus monitor as defined in claim 4 wherein:

the predetermined sampling time period is greater in time duration than an interval of the polling rate;

multiple items of bus phase information are obtained during each sampling time period; and the bus information is computed based on the multiple items of bus phase information during each sampling time period.

6. A bus monitor as defined in claim 5 further comprising:

a display connected to the processor to display the computed bus information: and wherein:

the predetermined sampling time periods continuously repeat; and the processor computes the bus information once each sampling period.

7. A bus monitor as defined in claim 6 wherein:

the processor supplies the computed bus information to the display once each sampling period; and the display updates the computed bus information displayed once each sampling period by displaying the most recent computed bus information.

8. A bus monitor as defined in claim 5 wherein:

the computed bus information describes the amount activity of each of a plurality of bus phases occurring during the sampling period.

9. A bus monitor as defined in claim 1 wherein the bus comprises a SCSI bus.

10. A bus monitor as defined in claim 1 wherein:

the storage device comprises a register;

the register stores bus phase information describing a plurality of bus phases which occur during a time interval of the polling rate; and the processor retrieves the bus phase information describing the plurality of bus phases during each interval of the polling rate.

11. A method of generating bus information in real-time which describes activity of an I/O bus during bus phases occurring in bus cycles, comprising the steps of:

sensing signals asserted on the bus which define the bus phases;

deriving bus phase information from the sensed signals;

collecting the bus phase information during a sampling period which extends over a plurality of bus cycles;

computing bus information using the bus phase information collected during the sampling period;

continuously repeating the sampling time periods;

sensing the signals and deriving the bus phase information once during each interval of a periodic polling rate; and setting the periodic polling rate differently from a rate at which the bus cycles occur.

12. A method as defined in claim 11 further comprising the step of:

displaying the computed bus information after each sampling period.

13. A method as defined in claim 12 further comprising the step of:

displaying the computed bus information after each sampling period based on additional bus phase information collected during the sampling period.

14. A method as defined in claim 13 wherein the bus is a SCSI bus which has control lines upon which control signals which define the bus phases are asserted, and the signals sensed are the control signals on the control lines.

15. A method as defined in claim 11 further comprising the step of:

storing the bus phase information in memory during each sampling period prior to computing the bus information.

16. A method as defined in claim 11 further comprising the step of:

setting the sampling rate to have a time duration during which a plurality of intervals of the polling rate occur.

17. A method of generating bus information in real-time which describes activity of an I/O bus during bus phases occurring in bus cycles, comprising the steps of:

sensing signals asserted on the bus which define the bus phases;

deriving bus phase information from the sensed signals:

collecting the bus phase information during a sampling period which extends over a plurality of bus cycles;

computing bus information using the bus phase information collected during the sampling period; and continuously repeating the sampling time periods computing the bus information to include a percentage of the number of occurrences of each bus phase in relation to the total number of bus phases occurring during each sample period.

* * * * *